United States Patent
Mönk et al.

(10) Patent No.: US 8,512,440 B2
(45) Date of Patent: Aug. 20, 2013

(54) METHOD FOR COMPRESSING CARBON DIOXIDE OR A GAS WHICH HAS SIMILAR PROPERTIES

(75) Inventors: Thomas Mönk, Gladbeck (DE); Marcus Nölke, Spring, TX (US); Lars Schlüter, Moers (DE)

(73) Assignee: Siemens Aktiengesellschaft, München (DE)

( * ) Notice: Subject to any disclaimer, the term of this patent is extended or adjusted under 35 U.S.C. 154(b) by 378 days.

(21) Appl. No.: 12/918,493

(22) PCT Filed: Oct. 29, 2008

(86) PCT No.: PCT/EP2008/064666
§ 371 (c)(1),
(2), (4) Date: Nov. 4, 2010

(87) PCT Pub. No.: WO2009/106160
PCT Pub. Date: Sep. 3, 2009

(65) Prior Publication Data
US 2011/0041686 A1 Feb. 24, 2011

(30) Foreign Application Priority Data
Feb. 25, 2008 (EP) .................... 08003404

(51) Int. Cl.
*B01D 53/00* (2006.01)

(52) U.S. Cl.
USPC ..................... 95/39; 62/613; 62/619

(58) Field of Classification Search
USPC .............. 95/39; 62/613, 619; 60/39.5
See application file for complete search history.

(56) References Cited

U.S. PATENT DOCUMENTS

| 5,931,021 A | 8/1999 | Meron |
| 2001/0015061 A1* | 8/2001 | Viteri et al. ............... 60/39.161 |
| 2003/0177785 A1 | 9/2003 | Bowen |

FOREIGN PATENT DOCUMENTS

GB 2416389 A 1/2006

OTHER PUBLICATIONS

Aspelund et al: "Gas conditioning—The interface between C02 capture and transport"—20070616—Bd. 1, Nr. 3, Jun. 16, 2007, Seiten 343-354, XP022119495—in der Anmeldung erwähnt—Seite 343, Spalte 1-Seite 344, Spalte I', Abbildungen 2,3—Seite 347, Spalte 2-Seite 348, Spalte 2; Magazine; 2007.

* cited by examiner

*Primary Examiner* — Robert A Hopkins

(57) ABSTRACT

A method is provided where carbon dioxide is compressed in a multi-stage geared compressor using a substantially isothermic process to a pressure which lies above the pressure of the critical point of carbon dioxide. The carbon dioxide is subsequently cooled to ambient temperature in a cooling device and then compressed to a predefined final pressure in a pump device.

2 Claims, 1 Drawing Sheet

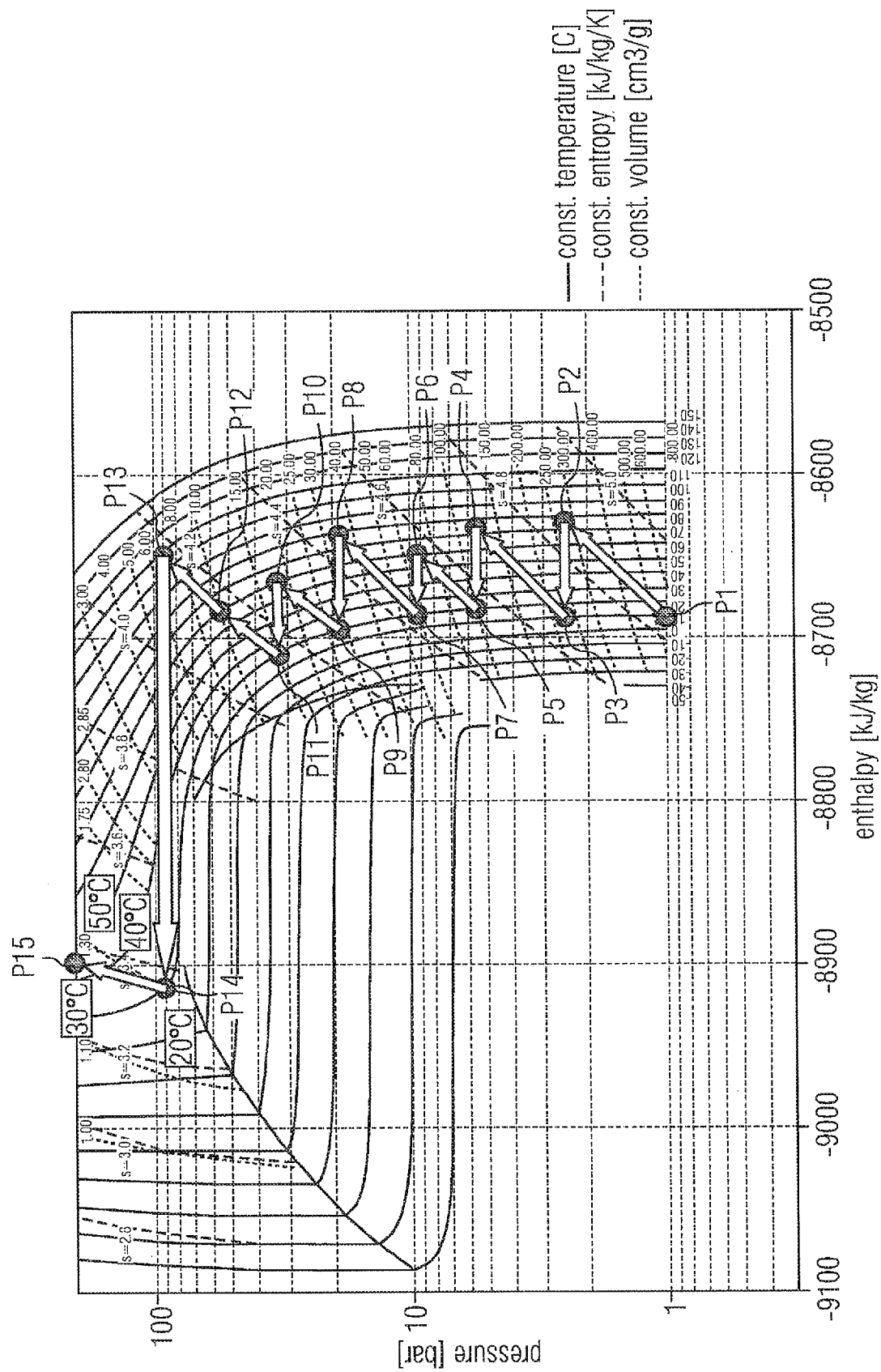

METHOD FOR COMPRESSING CARBON DIOXIDE OR A GAS WHICH HAS SIMILAR PROPERTIES

CROSS REFERENCE TO RELATED APPLICATIONS

This application is the US National Stage of International Application No. PCT/EP2008/064666, filed Oct. 29, 2008 and claims the benefit thereof. The International Application claims the benefits of European Patent Office application No. 08003404.4 EP filed Feb. 25, 2008. All of the applications are incorporated by reference herein in their entirety.

FIELD OF INVENTION

The invention relates to compressing carbon dioxide in a multi-stage geared compressor by means of a substantially isothermic process to a pressure which lies above the pressure of the critical point of carbon dioxide. The carbon dioxide is subsequently cooled to ambient temperature in a cooling device and then compressed to a predefined final pressure in a pump device.

BACKGROUND OF INVENTION

Carbon dioxide results during the combustion of carbonaceous fuels. In a given energy source, the amount of carbon dioxide which is produced is directly dependent upon the amount of fuel and therefore upon the converted energy. Modern plants and operating methods can certainly utilize the energy contained in the fuel better than previously, but do not prevent the creation of the gas.

Since no effective and economical method is available for carbon dioxide separation, this amount escapes into the atmosphere and contributes towards global warming. In order to avoid carbon dioxide getting into the atmosphere, it is known to store carbon dioxide in chambers deep beneath the earth's surface. Thus, in the North Sea for years climate gas has been pumped into rock formations deep beneath the seabed.

For this purpose, carbon dioxide has to be brought from ambient pressure and temperature to a pressure level which allows introduction of the gas via pipelines into an underground deposit.

This means that a compressor unit for the carbon dioxide must deliver a discharge pressure of 80-300 bar.

For this purpose, a correspondingly large capacity is required.

From the "International Journal of Greenhouse Gas Control I (2007)", an article by Audun Aspelund and Kristin Jordal was made known, which proposes $CO_2$ compression below the critical pressure to about 65 bar and a subsequent cooling for the condensation with subsequent pumping to a discharge pressure of 150 bar.

Particularly the comparatively low closed cooling temperature of about 10° C., which especially at the warm time of the year is to be provided by natural heat sinks only with great difficulty or not at all, is disadvantageous to the described method. In this case, consideration is especially to be given to the fact the amounts of carbon dioxide which are to be compressed require the closed cooling of a huge compression plant.

SUMMARY OF INVENTION

It is the object of the invention to disclose a method for compressing carbon dioxide, in which a capacity which is as low as possible is required.

For a method of the type referred to in the introduction, this object is achieved in a first step by the initially gaseous carbon dioxide being compressed in a compressor by means of an essentially isothermal process to a pressure which lies above the pressure of the critical point of carbon dioxide, in a second step by the carbon dioxide being cooled in a cooling device to a temperature below the temperature of the critical point, and in a third step by the carbon dioxide then being compressed in a pumping device to a predetermined discharge pressure.

With the method according to the invention, the discharge pressure is achieved by means of the combined use of turbocompressor and pumping device. The turbocompressor compresses and pumping device.

The turbocompressor compresses the gas from ambient conditions to a preliminary discharge pressure of 80-90 bar. In so doing, the process according to the invention moves close to an isothermal process. At the exit of the turbocompressor, the temperature of the gas is then about 120-140° C. As a result of directed closed cooling of the carbon dioxide at 80-90 bar to a temperature level of 10-30° C., a state of carbon dioxide is achieved in which the density lies close to the density of a typical liquid. The carbon dioxide which is present in this state can then be brought to a desired discharge pressure of up to 400 bar by means of pumping. The energy expenditure for the pumping in this case as a rule is considerably lower than a comparable compression by a turbocompressor.

If the delivered discharge pressure of 200 bar were not to be produced by a pump but by a compressor of another type, for example by a single-shaft compressor, approximately 10% more capacity would be required and the carbon dioxide would have to be at a temperature which is much too high for the pipeline. An additional recooler would then be required.

The method according to the invention has the significant advantage compared with the prior art that the closed cooling temperature lies in the region of the critical temperature of carbon dioxide, that is to say at 31° C. Such a temperature can be provided without any problem by means of a natural heat sink so that an additional refrigerating plant would not have to be provided, as is necessary in the prior art. Consequently, the efficiency of the entire plant increases and the use of the primary energy source can be reduced with the same capacity of the entire plant.

The carbon dioxide which is produced, even if in storable form, also drops accordingly. In this way, especially natural final storage deposits are loaded to capacity less quickly.

Furthermore, the heat exchanger for closed cooling of the compressed carbon dioxide can be simpler in design since the phase change in the wet vapor domain from gaseous carbon dioxide to liquid carbon dioxide necessitates a more expensive choice of material.

BRIEF DESCRIPTION OF THE DRAWINGS

The method according to the invention shall subsequently be described in more detail with reference to a pressure-enthalpy diagram which is represented in the drawing.

DETAILED DESCRIPTION OF INVENTION

In the pressure-enthalpy diagram which is represented, the method characteristic of the method according to the invention is shown in the form of arrows and points.

At the start of the method, the carbon dioxide which is to be compressed, under ambient temperatures, is located at point P1. In the gearing in the turbocompressor or in the geared compressor, the carbon dioxide is compressed from ambient pressure at point P1 to about 90 bar at point P13. In so doing, after each compression stage, apart from the last stage, recooling is carried out in order to take into account the isothermal compression process.

That is to say, between points P1 and P2, P3 and P4, P5 and P6, P7 and P8, P9 and P10, and P11 and P13, a compression of the carbon dioxide takes place in each case. Between these, recooling of the carbon dioxide takes place in each case at a respectively constant pressure level between the points P2 and P3, P4 and P5, P6 and P7, P8 and P9, and P10 and P11.

Despite this multiple recooling, the temperature at the exit of the geared compressor is about 120° C.

After this, in a special cooling device the carbon dioxide is recooled from 120° C. to 30° C., which is represented by means of the arrow between P13 and P14. In the process, the density of the carbon dioxide rises significantly and achieves a density of about 750 kg/m$^3$. As a result, the supercritical carbon dioxide or the supercritical gas has a density which is comparable to the density of a liquid and can be pumped in an almost incompressible manner. Consequently, the energy expenditure for pumping to 200 bar discharge pressure is comparatively low.

The special feature of the method according to the invention is the compression around the critical point, as a result of which condensing and a 2-phase current are dispensed with. The critical point for carbon dioxide lies at 74 bar and 31° C. From the pressure-enthalpy diagram, it can be gathered that the method characteristic of the method according to the invention extends beyond the critical point for carbon dioxide.

The invention claimed is:

1. A method for compressing carbon dioxide, comprising:
    compressing an initially gaseous carbon dioxide in a compressor using an essentially isothermal process to a first pressure which lies above a second pressure of the critical point of carbon dioxide;
    cooling the carbon dioxide in a cooling device to a first temperature below a second temperature of the critical point, in order to achieve a first density which is close to a second density of a typical liquid; and
    compressing the carbon dioxide in a pumping device to a predetermined discharge pressure.

2. The method for compressing carbon dioxide as claimed in claim 1, wherein in order to achieve the discharge pressure, both a turbocompressor and a pumping device are used.

* * * * *